Figure 1:
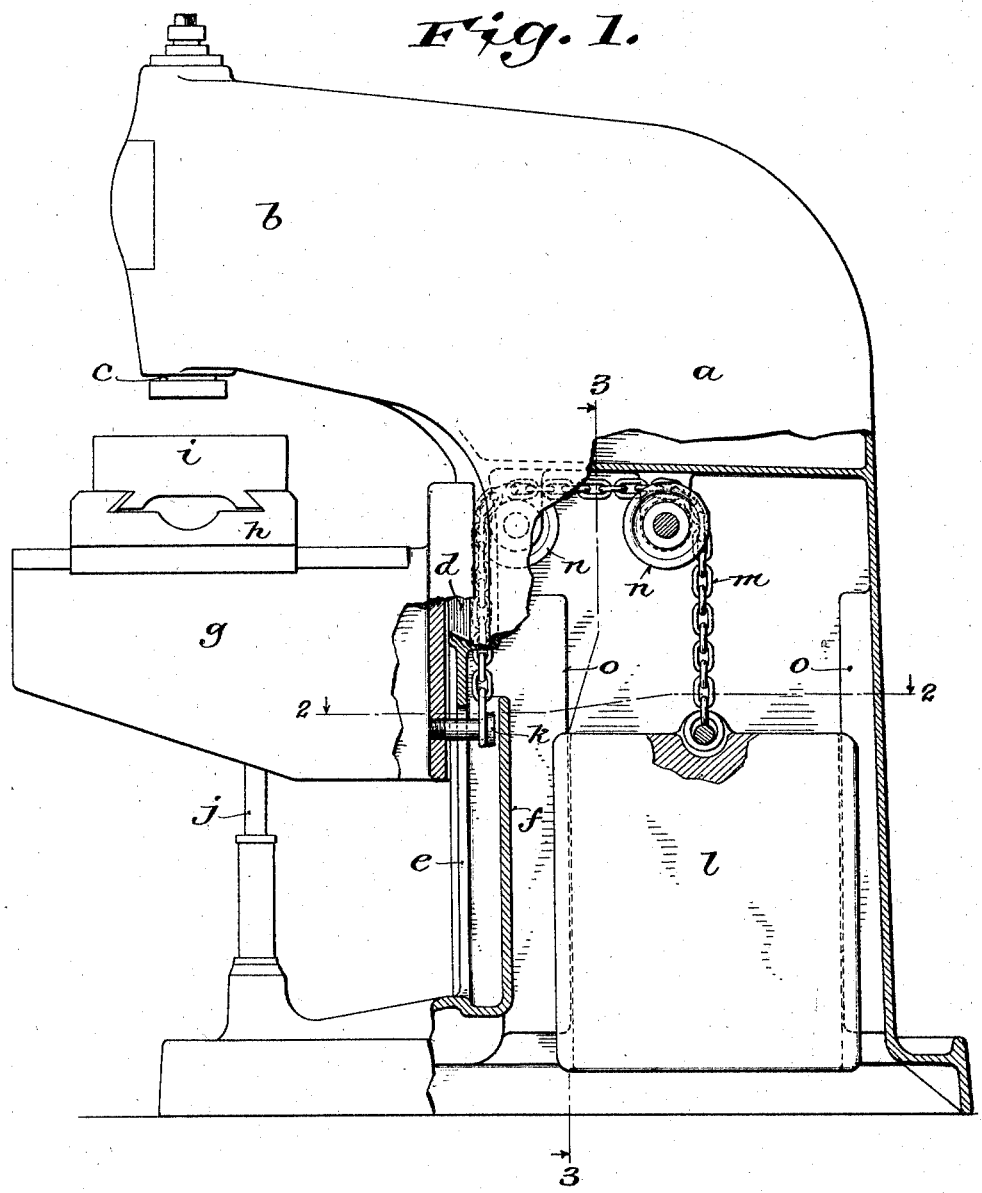

F. A. PARSONS.
MILLING MACHINE.
APPLICATION FILED SEPT. 5, 1916.

1,307,749.

Patented June 24, 1919.
2 SHEETS—SHEET 2.

Inventor
Fred A. Parsons
By Chandlee Bottum Kansell Bottum
Attorneys.

UNITED STATES PATENT OFFICE.

FRED A. PARSONS, OF MILWAUKEE, WISCONSIN, ASSIGNOR TO THE KEMPSMITH MANUFACTURING CO., OF WEST ALLIS, WISCONSIN, A CORPORATION OF WISCONSIN.

MILLING-MACHINE.

1,307,749.  Specification of Letters Patent.  Patented June 24, 1919.

Application filed September 5, 1916. Serial No. 118,406.

*To all whom it may concern:*

Be it known that I, FRED A. PARSONS, a citizen of the United States, residing at Milwaukee, in the county of Milwaukee and State of Wisconsin, have invented certain new and useful Improvements in Milling-Machines, of which the following is a specification, reference being had to the accompanying drawing, forming a part thereof.

This invention relates more particularly to provision for vertical adjustment of the relation between the work and cutter in milling machines of the vertical spindle type.

In this type of machine as now constructed, in order to overcome the difficulty and inconvenience of raising and lowering the work with the heavy work-supporting organization comprising a vertically sliding knee and horizontally sliding saddle and table, the spindle is usually made vertically adjustable. This necessitates mounting the spindle in an auxiliary head or carrier, which in turn is slidably mounted in the supporting column or frame at the expense of that rigidity and stability essential to prevent deflection of the spindle and cutter by cutting or working strains.

Such an arrangement also necessitates the provision for raising and lowering the auxiliary spindle head or carrier, means such as adjustable gibs for taking up wear and play in the sliding bearings between the spindle head and column, and means such as clamps, for locking and holding the spindle head and spindle as rigidly as possible in adjusted position, thereby materially and detrimentally complicating the construction of machines of this type.

In the smaller machines of this type, the supplementary vertical movement of the spindle is sometimes omitted, since, although it is very inconvenient, it is not beyond the strength of the operator to raise the work table together with the saddle and knee.

The main objects of the present invention are to facilitate the vertical adjustment of the relation between the work mounted on the table and the cutter mounted on the spindle without resorting to vertical movement of the spindle and its bearings or support; to avoid the above noted complications in the construction of such machines incident to making the spindle vertically adjustable or movable; and generally to improve the construction and operation of machines of this type.

The invention consists in the peculiar arrangement, construction and combination of parts as hereinafter particularly described and pointed out in the claims.

In the accompanying drawing like characters designate the same parts in the several figures.

Figure 2:
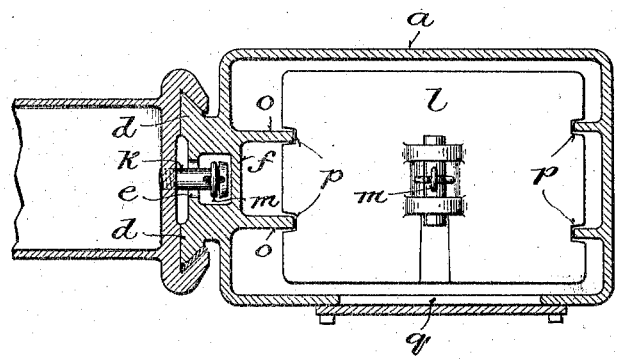
Figure 3:
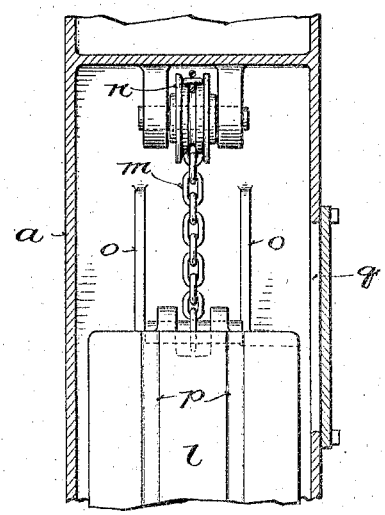

Figure 1 is a side elevation of a vertical milling machine embodying the invention, parts of the column and knee being broken away and shown in vertical section; Fig. 2 is a horizontal section on the line 2—2, Fig. 1; and Fig. 3 is a vertical section on the line 3—3, Fig. 1.

The machine comprises a hollow column *a*, having an overhanging arm *b*, in which a vertical cutter or tool spindle *c* is rotatably mounted in stationary bearings which are adapted to firmly support it under working conditions against deflection by cutting strains. The column, which may be generally of the form and construction usually employed in this type of machines, is formed or provided on the side below the arm *b*, with vertical parallel slide ways *d*, and between said ways with a vertical slot *e*. This slot is closed on the inner side by a housing or inwardly offset wall *f*, open at the top and closed at the bottom, as shown in Fig. 1.

The machine is provided with a work supporting organization like or similar to that employed in machines of this class, and comprising a vertically movable knee *g*, slidably mounted on the ways *d* of the column, a saddle *h* slidably mounted on and movable horizontally lengthwise of the knee *g*, and a table *i*, slidably mounted on the saddle and movable horizontally crosswise of the saddle.

Means for raising and lowering the work supporting organization by hand or power, such as a vertical screw shaft *j*, connecting the knee *g* with the base of the column, are provided.

The knee is provided with a stud or part *k*, projecting through the slot *e* in the column into the housing *f*, for the attachment of a counterbalance such as a weight, as hereinafter described, to facilitate the vertical adjustment or movement of the work with relation to the cutter, and to avoid occasion for the vertical adjustment or movement of the spindle c.

To facilitate the vertical movement and adjustment of the knee g with the load which it carries, a counterbalance is connected with the knee. As shown by the drawing, a heavy vertically movable counterweight l, inclosed and guided in the column a, is connected by a chain m or other suitable flexible connection passing over grooved guiding sheaves n, in the upper part of the column and attached to the stud k within the housing f, which is traversed by the stud in the vertical movement of the knee. The counterweight is preferably guided and held in place within the column by vertical ribs or guides o formed on or attached to opposite walls of the column and loosely engaging corresponding grooves or ways p in the counterweight. The counterweight may be made in various ways, of different sizes, shapes and materials, according to the size and design of the machine to which it is applied.

Various modifications in the construction and arrangement of parts of the machine other than those mentioned, may be made, without departure from the principle and scope of the invention as defined in the following claims.

I claim:

1. In a milling machine the combination of a hollow column having a vertical slot closed at the back and sides by an inwardly offset wall, a sheave mounted in the column above the slot, a vertically adjustable work support guided on the column and having a part projecting into said slot, a counterbalance within the column, and a flexible connection passing over the sheave and attached to the counterbalance and to the inwardly projecting part of the work support, within said slot.

2. In a milling machine the combination of a hollow column having an overhanging arm provided with a stationary bearing, a vertical slot in one side and inset housing for the slot open at the top and closed at the sides and back, a vertical spindle rotatably mounted in said bearing, a vertically movable work support slidably mounted on the slotted side of the column below its overhanging arm and having a part projecting through said slot, a vertically movable weight inclosed and guided in said column and adapted to approximately balance said work support, sheaves mounted in the column above the weight, and a flexible connection passing over the sheaves and attached to the weight and to the projection on the work support within said housing.

FRED A. PARSONS.

Copies of this patent may be obtained for five cents each, by addressing the "Commissioner of Patents, Washington, D. C."